(12) United States Patent
Ogawa et al.

(10) Patent No.: US 12,157,852 B2
(45) Date of Patent: Dec. 3, 2024

(54) ANTHRAQUINONE COMPOUND, LIQUID CRYSTAL COMPOSITION CONTAINING SAID COMPOUND, AND DIMMING ELEMENT

(71) Applicant: Nippon Kayaku Kabushiki Kaisha, Tokyo (JP)

(72) Inventors: Kanae Ogawa, Tokyo (JP); Kohei Ohtani, Tokyo (JP); Saori Suzuki, Tokyo (JP); Hitomi Muto, Tokyo (JP); Masakazu Shiraishi, Tokyo (JP); Yu Hattori, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/276,357

(22) PCT Filed: Mar. 8, 2022

(86) PCT No.: PCT/JP2022/009915
§ 371 (c)(1),
(2) Date: Aug. 8, 2023

(87) PCT Pub. No.: WO2022/191169
PCT Pub. Date: Sep. 15, 2022

(65) Prior Publication Data
US 2024/0150657 A1 May 9, 2024

(30) Foreign Application Priority Data
Mar. 11, 2021 (JP) .................................. 2021-039380

(51) Int. Cl.
*G02F 1/1333* (2006.01)
*C09B 1/58* (2006.01)
*C09K 19/60* (2006.01)
*G02F 1/1343* (2006.01)

(52) U.S. Cl.
CPC ............ *C09K 19/603* (2013.01); *C09B 1/585* (2013.01); *G02F 1/13439* (2013.01)

(58) Field of Classification Search
CPC ...... C09K 19/60; C09K 19/603; C09B 1/585; G02F 1/1333; G02F 1/13439; G02F 1/13725
See application file for complete search history.

(56) References Cited

U.S. PATENT DOCUMENTS

| | | | |
|---|---|---|---|
| 5,200,290 | A | 4/1993 | Ong et al. |
| 2010/0227084 | A1 | 9/2010 | Kato et al. |
| 2018/0307077 | A1 | 10/2018 | Miura et al. |
| 2024/0140907 | A1* | 5/2024 | Ohtani ................. C07C 323/38 |
| 2024/0141234 | A1* | 5/2024 | Muto ................... C09K 19/542 |
| 2024/0150657 | A1* | 5/2024 | Ogawa ................. C09K 19/603 |

FOREIGN PATENT DOCUMENTS

| | | |
|---|---|---|
| EP | 0059036 A1 | 9/1982 |
| GB | 2094822 A | 9/1982 |
| JP | 57-158262 A | 9/1982 |
| JP | 61-87756 A | 5/1986 |
| JP | 63-501512 A | 6/1988 |
| JP | 3-47392 A | 2/1991 |
| JP | 4-264193 A | 9/1992 |

(Continued)

OTHER PUBLICATIONS

International Search Report mailed Jun. 7, 2023 in corresponding PCT application No. PCT/JP2022/009915.

*Primary Examiner* — Geraldina Visconti
(74) *Attorney, Agent, or Firm* — Nields, Lemack & Frame, LLC

(57) ABSTRACT

The purpose of the present invention is to provide a novel anthraquinone compound, and to provide: a dichroic dye constituted of the novel anthraquinone compound; a liquid crystal composition which contains the dichroic dye; and preferably a dimming element having excellent contrast and light resistance and containing said composition. The present invention discloses an anthraquinone compound represented by formula A below (wherein $R_1$ represents a C3-16 branched alkyl group, and $R_2$ represents a hydrogen atom, a C1-8 straight-chain or branched alkyl group, or a C1-8 straight-chain or branched alkoxy group). In addition, the present invention discloses a liquid crystal composition including the anthraquinone compound and a liquid crystal material, and a dimming element containing said composition.

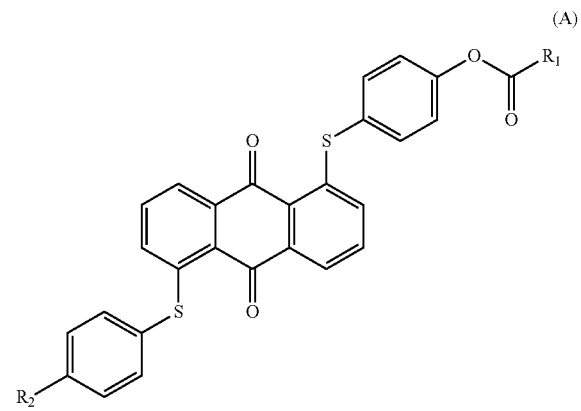

(A)

20 Claims, No Drawings

(56) References Cited

FOREIGN PATENT DOCUMENTS

| JP | 2003-138262 A | 5/2003 |
| JP | 2010-202799 A | 9/2010 |
| JP | 2011-190314 A | 9/2011 |
| JP | 2018-205746 A | 12/2018 |
| WO | 87/01822 A1 | 3/1987 |

* cited by examiner

ANTHRAQUINONE COMPOUND, LIQUID CRYSTAL COMPOSITION CONTAINING SAID COMPOUND, AND DIMMING ELEMENT

TECHNICAL FIELD

The present invention relates to a novel anthraquinone compound, a liquid crystal composition containing the compound, and a light control element.

BACKGROUND ART

Various ideas have been proposed regarding light control films that control transmission of external light for the purpose of protecting privacy and the like for windows, doors, partitions, and the like of vehicles such as trains and automobiles, and buildings such as business buildings and hospitals (see Patent Literature 1 and 2). As one of such light control films, there is a light control film obtained by using a liquid crystal. Usually, a liquid crystal light control film can block a field of view by controlling transmission or scattering of light depending on whether or not a voltage is applied, but cannot block light itself, so that glare tends to increase due to light scattering. Therefore, for the purpose of reducing glare, improving contrast, and the like, attempts have been made to use a dye as a material of a light control panel (see Patent Literature 3 and 4). When such a light control panel is used for a window glass of an automobile, there is a demand for dark coloring at the time of light shielding as well as good visibility without cloudiness at the time of transparency, and also for light resistance without decrease in transmittance even when light is applied at high temperatures for a long period of time due to the effect of long-term exposure in outdoor use.

A dichroic dye is common as a dye used for a liquid crystal light control film. As a light control element obtained by using a liquid crystal composition containing a dichroic dye, a guest-host (GH) type light control element has been known, and various dichroic dyes have been proposed (see Patent Literature 5 and 6).

Such a dichroic dye is required to have light resistance, heat resistance, and the like as well as contrast when used in a display element. Efforts have been made to improve these characteristics, but a dichroic dye that can satisfy contrast and light resistance has not been found. For example, Patent Literature 5 and 6 disclose dichroic dyes suitable for light control applications, but the dyes in the literature have insufficient contrast and light resistance.

CITATION LIST

Patent Literature

PATENT LITERATURE 1: JPS63-501512A
PATENT LITERATURE 2: JPH03-47392A
PATENT LITERATURE 3: JP2018-205746A
PATENT LITERATURE 4: JP2011-190314A
PATENT LITERATURE 5: JPS61-87756A
PATENT LITERATURE 6: EP59036A1

SUMMARY OF INVENTION

Technical Problem

A first object of the present invention is to provide a novel anthraquinone compound.

Another object of the present invention is to provide a dichroic dye which is the novel anthraquinone compound, a liquid crystal composition containing the dichroic dye, and a light control element that is excellent in contrast and light resistance and contains the composition.

Solution to Problem

The present inventors have succeeded in obtaining a novel anthraquinone compound having a specific structure.

In addition, the present inventors have found that a light control element being excellent in contrast and light resistance can be obtained by producing a light control element using a liquid crystal composition containing a dichroic dye which is such a novel anthraquinone compound.

That is, aspects included in the present invention are as follows.

[1].
An anthraquinone compound represented by Formula (A) below:

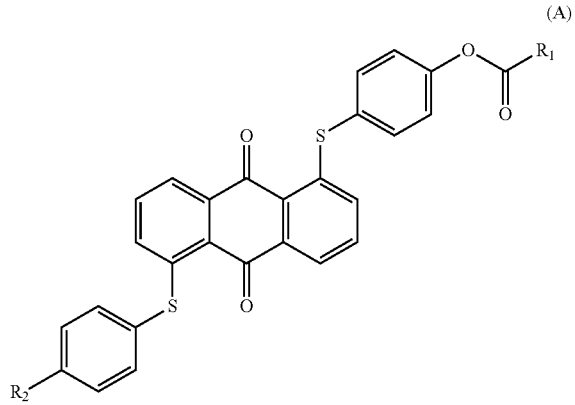

(A)

wherein $R_1$ represents a branched alkyl group having 3 to 16 carbon atoms, and $R_2$ represents a hydrogen atom, a straight-chain or branched alkyl group having 1 to 8 carbon atoms, or a straight-chain or branched alkoxy group having 1 to 8 carbon atoms.

[2].
The anthraquinone compound according to item [1], wherein $R_1$ is a branched alkyl group having 6 to 16 carbon atoms.

[3].
The anthraquinone compound according to item [2], wherein $R_1$ is a branched alkyl group represented by Formula (B) below:

(B)

wherein $R_3$ represents a straight-chain alkyl group having 1 to 6 carbon atoms, and $R_4$ represents a straight-chain alkyl group having 1 to 9 carbon atoms, provided that a total number of carbon atoms in the straight-chain alkyl group represented by $R_3$ and carbon atoms in the straight-chain alkyl group represented by $R_4$ is 5 to 15.

[4].

The anthraquinone compound according to item [3], wherein $R_3$ is a methyl group and $R_4$ is a straight-chain alkyl group having 4 to 7 carbon atoms, or $R_3$ is an ethyl group or a propyl group and $R_4$ is a straight-chain alkyl group having 3 to 7 carbon atoms.

[5].

The anthraquinone compound according to any one of items [1] to [4], wherein $R_2$ is a straight-chain alkoxy group having 1 to 8 carbon atoms.

[6].

The anthraquinone compound according to item [5], wherein $R_2$ is a straight-chain alkoxy group having 1 to 4 carbon atoms.

[7].

The anthraquinone compound according to any one of items [1] to [4], wherein $R_2$ is a hydrogen atom or a straight-chain or branched alkyl group having 1 to 4 carbon atoms.

[8].

A liquid crystal composition comprising the anthraquinone compound according to any one of items [1] to [7] and a liquid crystal material.

[9].

The liquid crystal composition according to item [8], further comprising a dichroic dye other than the anthraquinone compound represented by Formula (A).

[10].

The liquid crystal composition according to item [8] or [9], further comprising a photocurable compound and a photopolymerization initiator.

[11].

A photocured product comprising the liquid crystal composition according to item [10].

[12].

A light control element comprising a pair of substrates that are oppositely disposed, and the liquid crystal composition according to item [8] or [9] or the photocured product according to item [11] sandwiched between the substrates, at least one of the substrates being a transparent substrate having a transparent electrode.

[13].

The light control element according to item [12], wherein both of the pair of substrates are transparent substrates each having a transparent electrode.

Advantageous Effects of Invention

The anthraquinone compound of the present invention is useful as a dichroic dye for a liquid crystal light control element. Use of a liquid crystal composition containing such a dichroic dye can provide a light control element that is excellent in contrast and light resistance.

DESCRIPTION OF EMBODIMENTS

Hereinafter, the present invention will be described in detail.

The compound of the present invention (i.e., the anthraquinone compound) is represented by Formula (A) below.

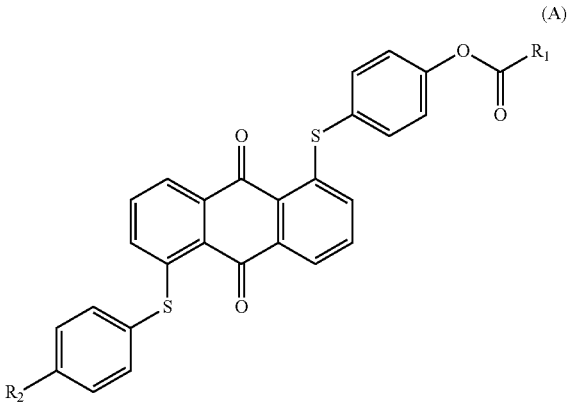

In Formula (A), $R_1$ represents a branched alkyl group having 3 to 16 carbon atoms.

Specific examples of the branched alkyl group having 3 to 16 carbon atoms represented by $R_1$ in Formula (A) include an iso-propyl group, an iso-butyl group, a sec-butyl group, a t-butyl group, an iso-pentyl group, an iso-hexyl group, a t-pentyl group, a 1-methylpentyl group, a 2-methylpentyl group, a 1-methylhexyl group, a 2-methylhexyl group, a 1-methylheptyl group, a 2-methylheptyl group, a 1-methyloctyl group, a 2-methyloctyl group, a 1-methylnonyl group, a 2-methylnonyl group, a 3-methylbutyl group, a 3-methylpentyl group, a 3-methylhexyl group, a 3-methylheptyl group, a 3-methyloctyl group, a 1-ethylpropyl group, a 2-ethylpropyl group, a 1-ethylbutyl group, a 2-ethylbutyl group, a 1-ethylhexyl group, a 2-ethylhexyl group, a 1-ethylheptyl group, a 2-ethylheptyl group, a 1-propylhexyl group, a 2-propylhexyl group, a 1-butylhexyl group, a 2-butylhexyl group, a 1-pentylhexyl group, a 2-pentylhexyl group, a 1-pentylheptyl group, a 2-pentylheptyl group, a 1-pentyloctyl group, a 2-pentyloctyl group, a 1-pentylnonyl group, a 2-pentylnonyl group, a 1-pentyldecyl group, a 2-pentyldecyl group, a 1-hexylheptyl group, a 2-hexylheptyl group, a 1-hexylnonyl group, a 2-hexylnonyl group, a 1-hexyldecyl group, and a 2-hexyldecyl group. $R_1$ is preferably a branched alkyl group having 6 to 16 carbon atoms.

$R_1$ in Formula (A) is more preferably a branched alkyl group represented by Formula (B) below.

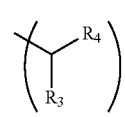

In Formula (B), $R_3$ represents a straight-chain alkyl group having 1 to 6 carbon atoms.

Specific examples of the straight-chain alkyl group having 1 to 6 carbon atoms represented by $R_3$ in Formula (B) include a methyl group, an ethyl group, an n-propyl group, an n-butyl group, an n-pentyl group, and an n-hexyl group. $R_3$ is preferably a methyl group, an ethyl group, or an n-propyl group, and more preferably an ethyl group or an n-propyl group.

In Formula (B), $R_4$ represents a straight-chain alkyl group having 1 to 9 carbon atoms.

Specific examples of the straight-chain alkyl group having 1 to 9 carbon atoms represented by $R_4$ include the same groups as the specific examples of the straight-chain alkyl group having 1 to 6 carbon atoms represented by $R_3$, and an n-heptyl group, an n-octyl group, and an n-nonyl group. $R_4$ is preferably an n-propyl group, an n-butyl group, an n-pentyl group, an n-hexyl group, or an n-heptyl group.

However, the total number of carbon atoms in the straight-chain alkyl group represented by $R_3$ and carbon atoms in the straight-chain alkyl group represented by $R_a$ is 5 to 15. That is, the number of carbon atoms in the branched alkyl group represented by Formula (B) is 6 to 16.

$R_3$ and $R_4$ in Formula (B) are preferably such that $R_3$ is a methyl group and $R_4$ is a straight-chain alkyl group having 4 to 7 carbon atoms, or $R_3$ is an ethyl group or a propyl group and $R_4$ is a straight-chain alkyl group having 3 to 7 carbon atoms. It is more preferable that $R_3$ is an ethyl group or a propyl group, and $R_4$ is a straight-chain alkyl group having 3 to 7 carbon atoms.

In Formula (A), $R_2$ represents a hydrogen atom, a straight-chain or branched alkyl group having 1 to 8 carbon atoms, or a straight-chain or branched alkoxy group having 1 to 8 carbon atoms.

Specific examples of the straight-chain or branched alkyl group having 1 to 8 carbon atoms represented by $R_2$ in Formula (A) include the same groups as the branched alkyl group having 3 to 8 carbon atoms described in the section of specific examples of the branched alkyl group having 3 to 16 carbon atoms represented by $R_1$ in Formula (A) and the same groups as the straight-chain alkyl group having 1 to 8 carbon atoms described in the section of specific examples of the straight-chain alkyl group having 1 to 9 carbon atoms represented by $R_4$ in Formula (B). A straight-chain or branched alkyl group having 1 to 4 carbon atoms is preferable.

Specific examples of the straight-chain or branched alkoxy group having 1 to 8 carbon atoms represented by $R_2$ in Formula (A) include a methoxy group, an ethoxy group, an n-propoxy group, an iso-propoxy group, an n-butoxy group, an iso-butoxy group, a sec-butoxy group, a t-butoxy group, an n-pentyloxy group, an iso-pentyloxy group, a neo-pentyloxy group, a t-pentyloxy group, a hexyloxy group, a heptyloxy group, and an octyloxy group. A straight-chain alkoxy group having 1 to 8 carbon atoms is preferable, and a straight-chain alkoxy group having 1 to 4 carbon atoms is more preferable.

$R_2$ in Formula (A) is preferably a hydrogen atom, a straight-chain or branched alkyl group having 1 to 8 carbon atoms, or a straight-chain alkoxy group having 1 to 8 carbon atoms. $R_2$ is more preferably a hydrogen atom, a straight-chain or branched alkyl group having 1 to 4 carbon atoms, or a straight-chain alkoxy group having 1 to 4 carbon atoms.

Suitable specific examples of the compound represented by Formula (A) include the following compounds.

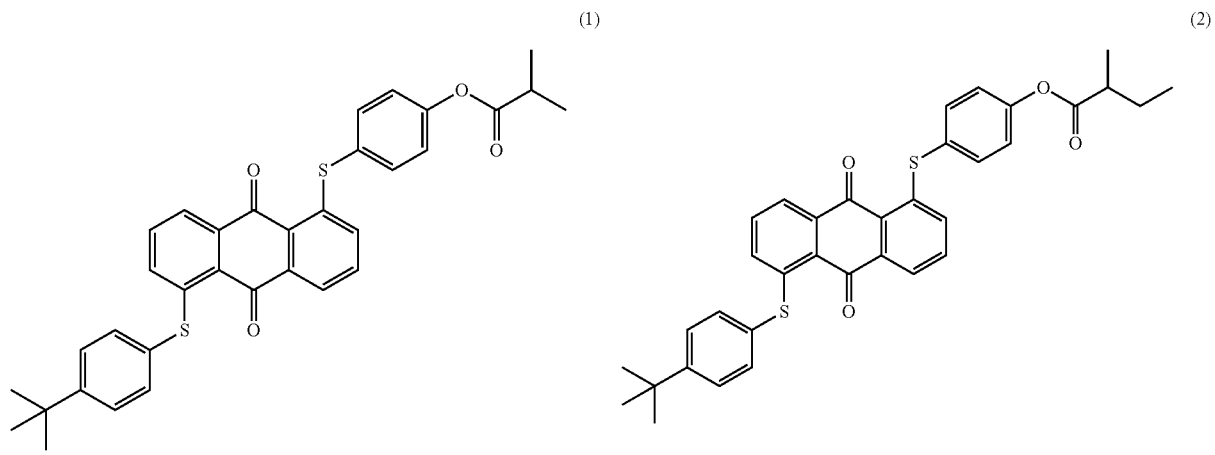

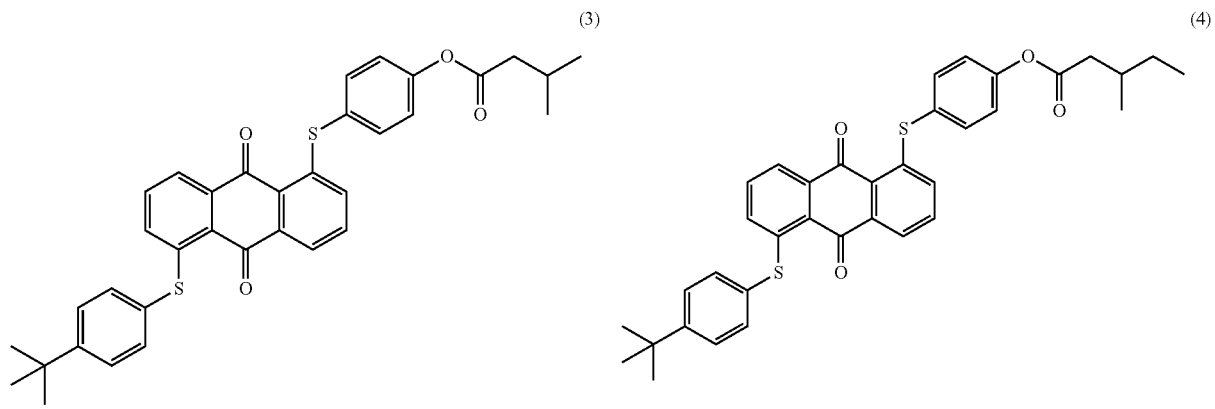

-continued
(5)
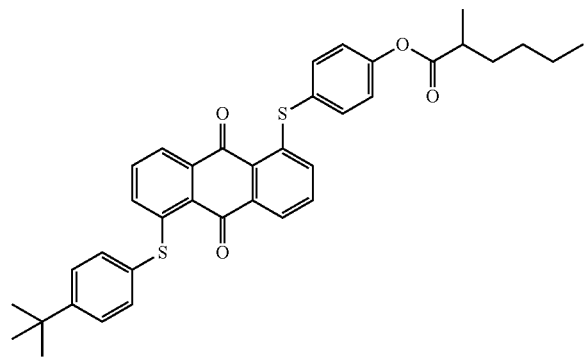
(6)
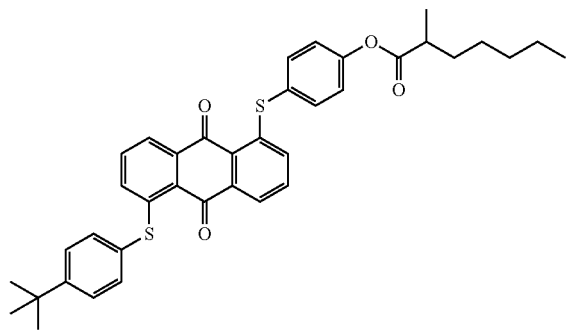
(7)
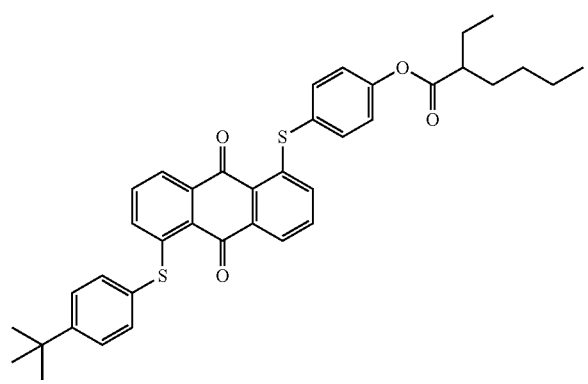
(8)
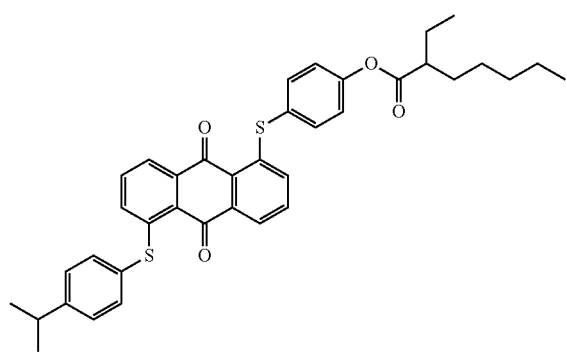
(9)
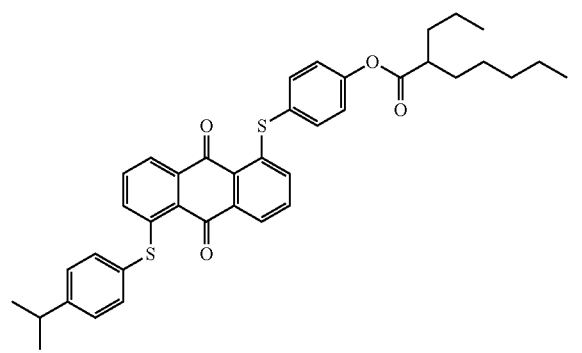
(10)
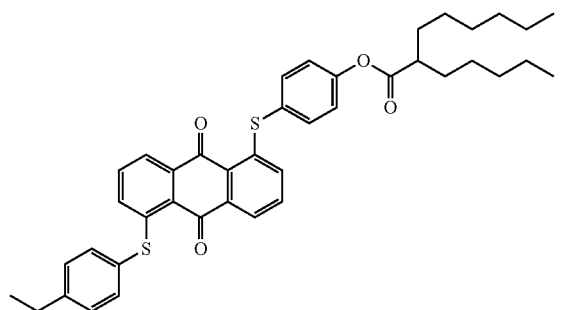
(11)
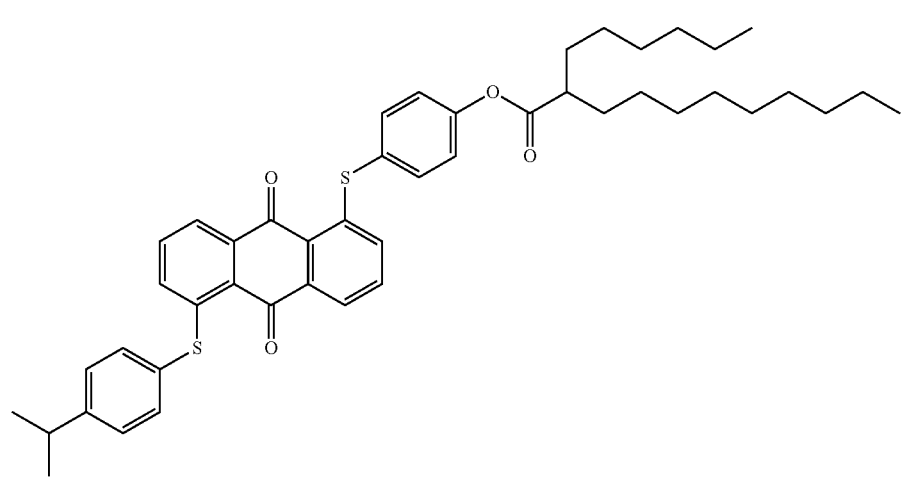

-continued
(12)
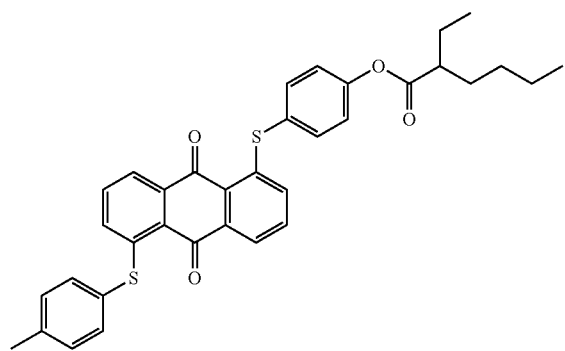
(13)
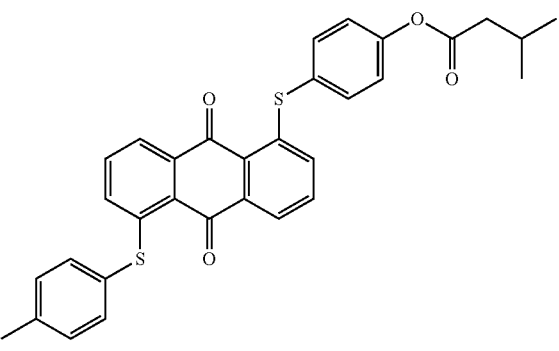
(14)
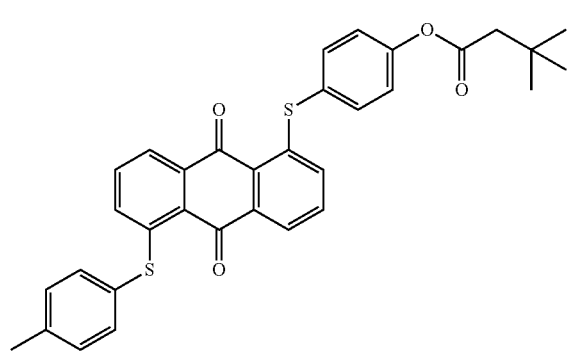
(15)
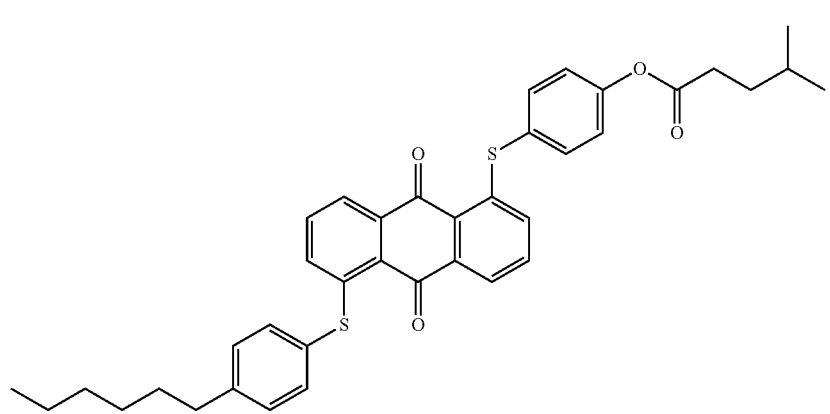
(16)
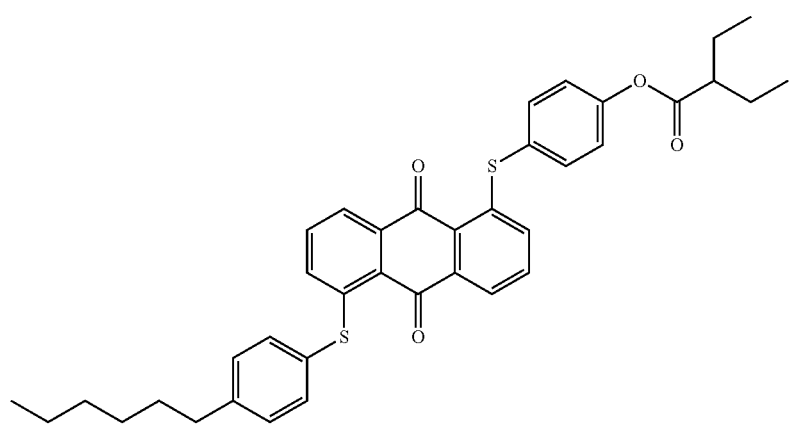

(17)
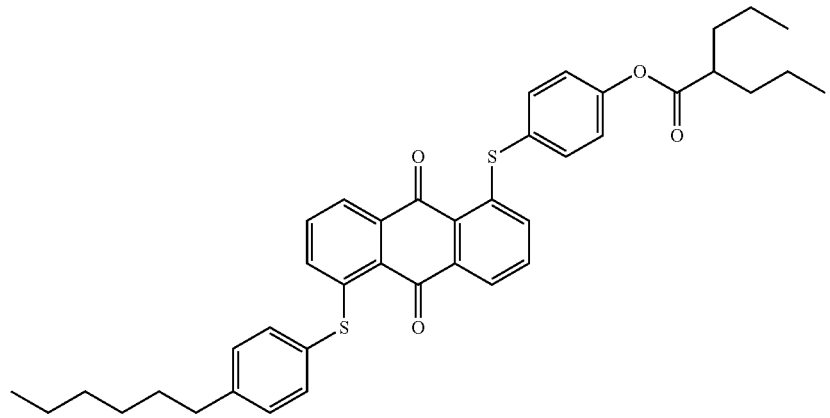
(18)
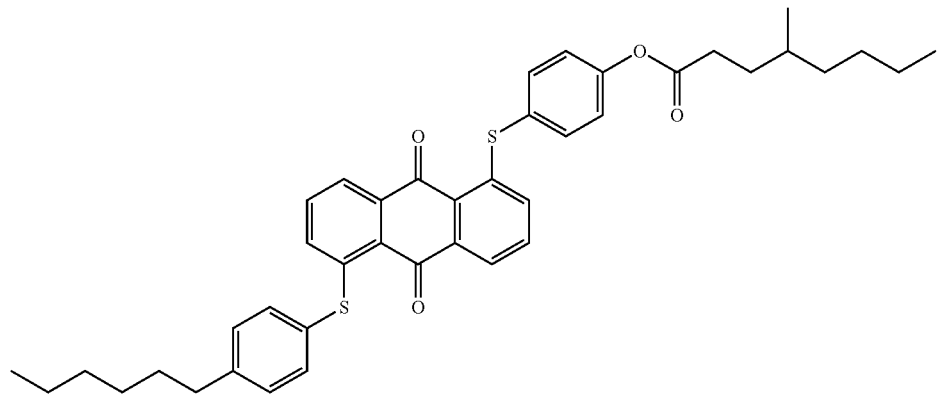
(19)
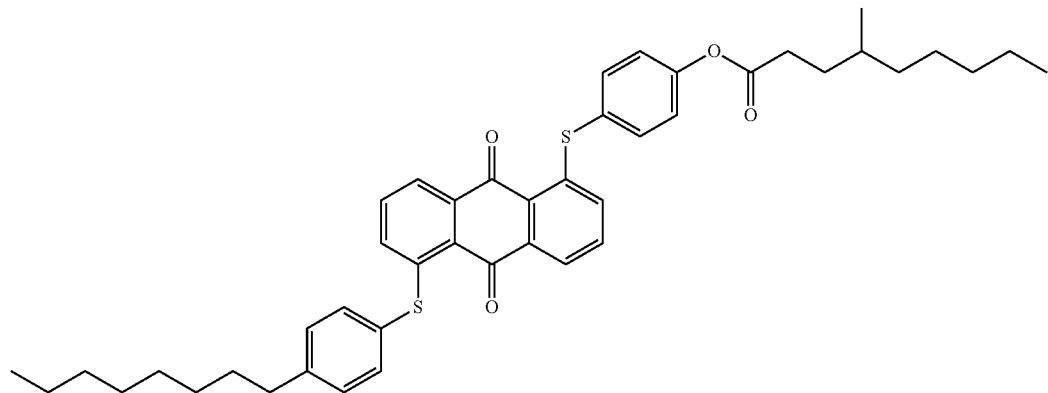
(20)
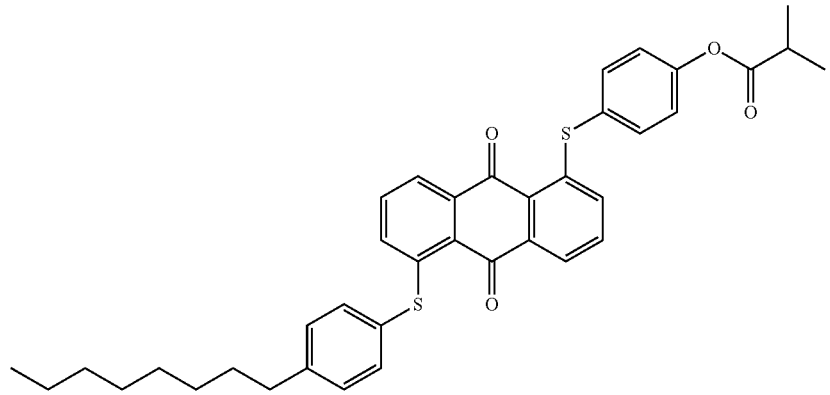

-continued
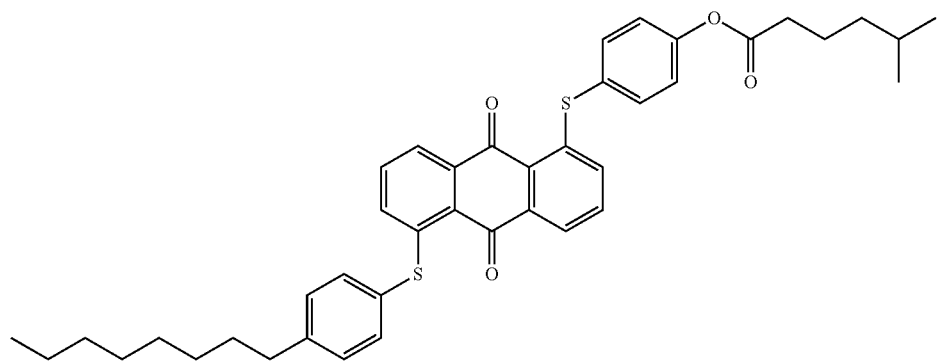
(21)
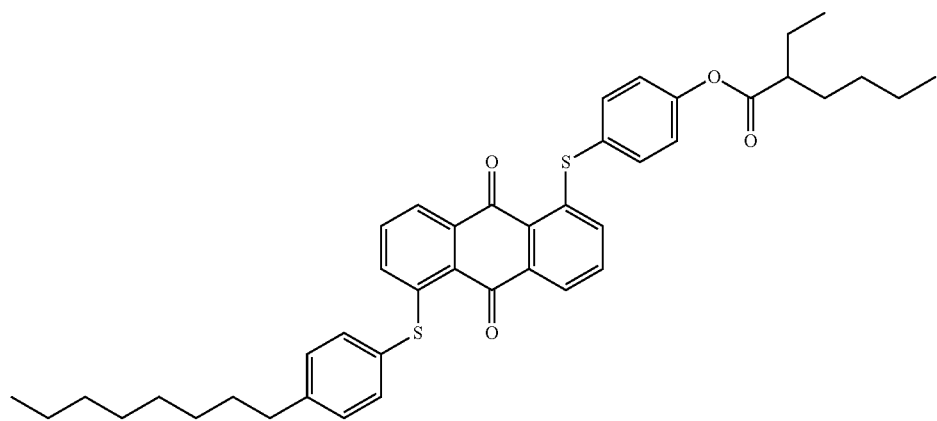
(22)
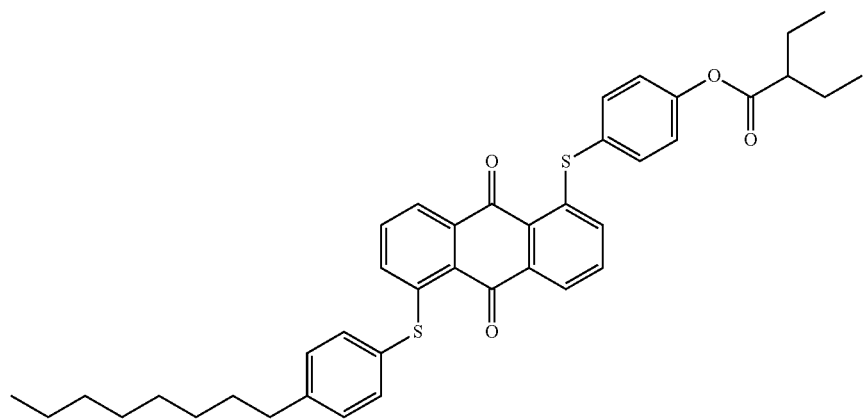
(23)
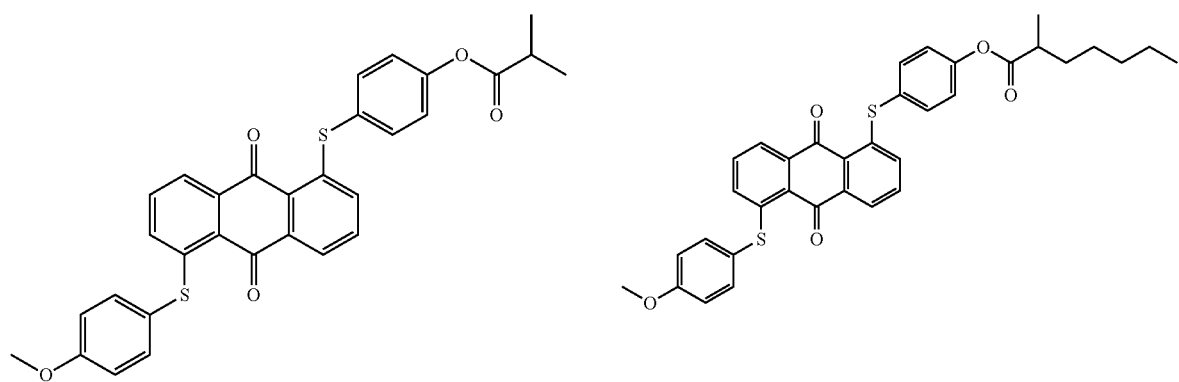
(24) (25)

(26)
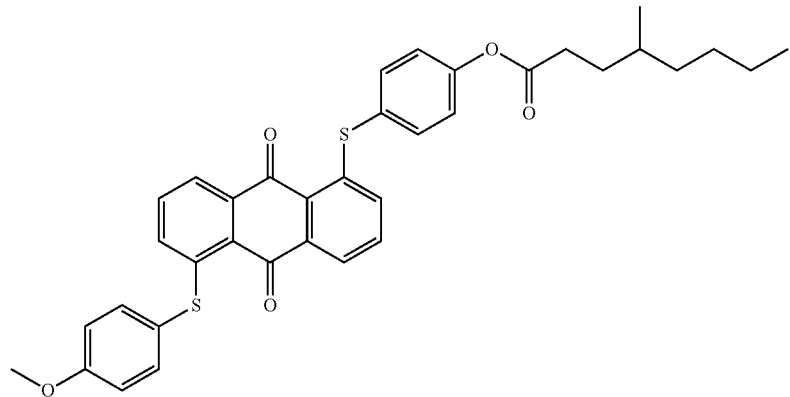
(27)
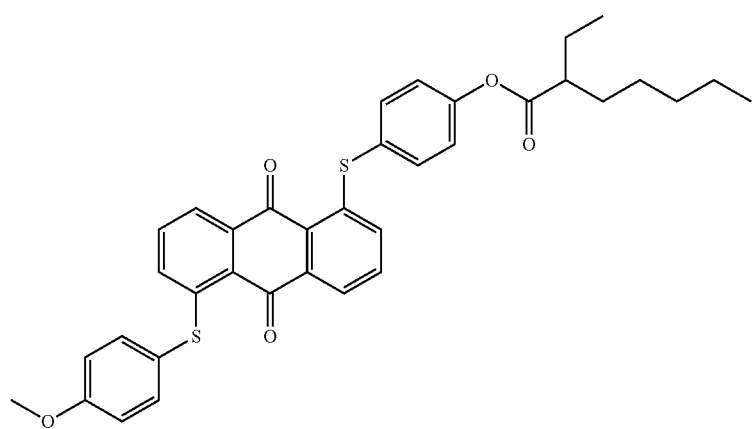
(28)
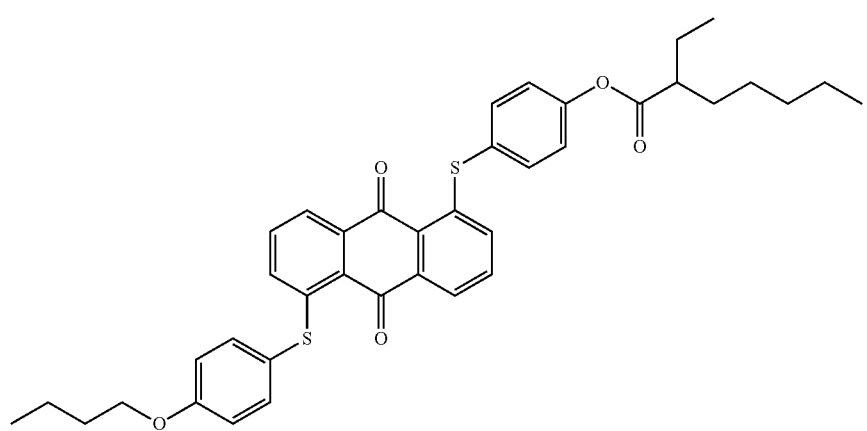

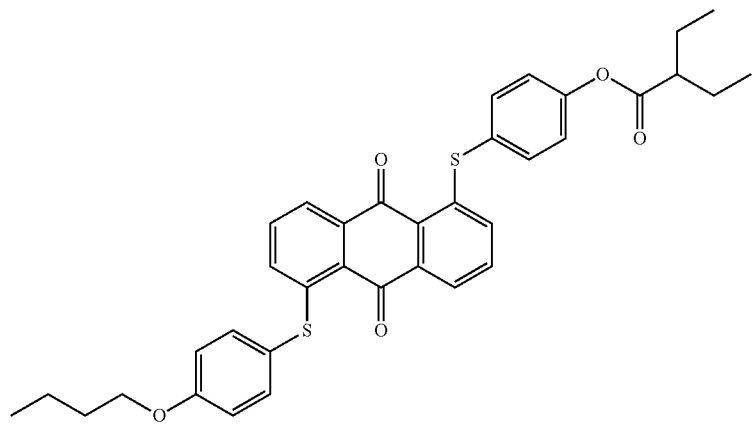
(29)
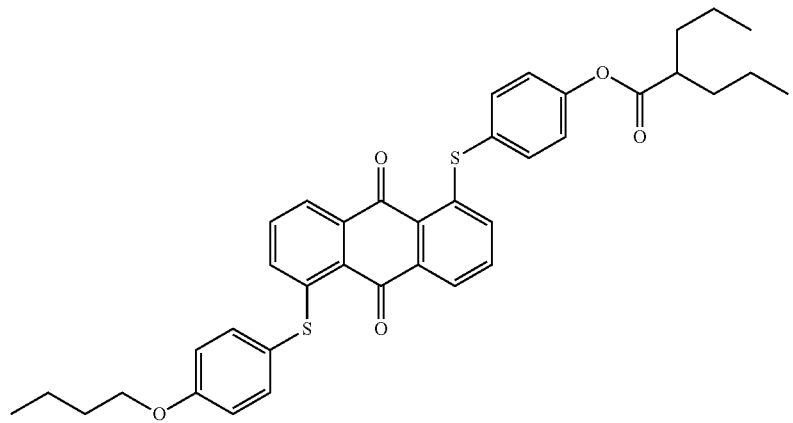
(30)
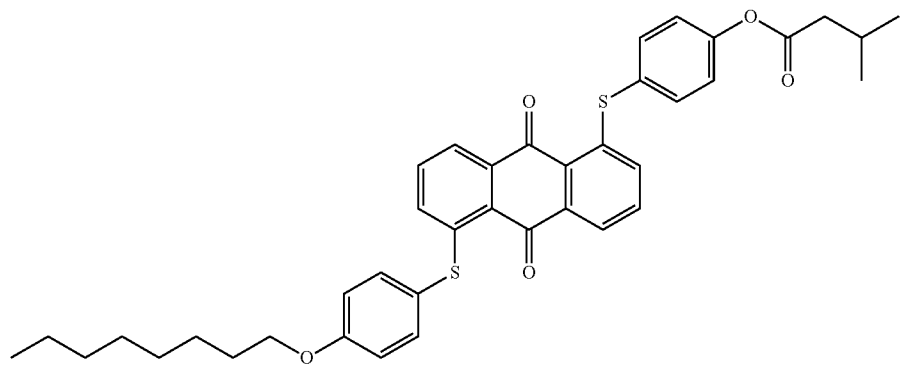
(31)
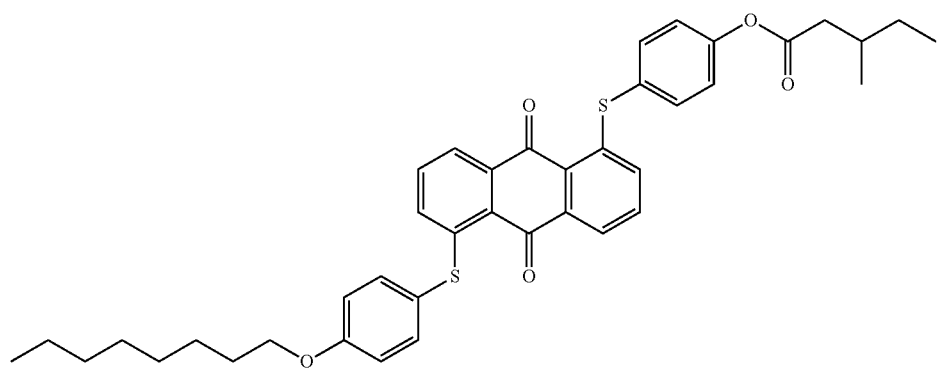
(32)

(33)
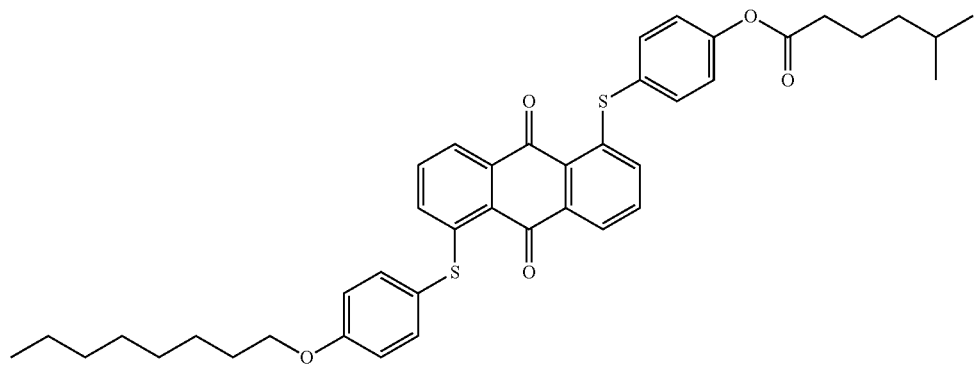
(34)
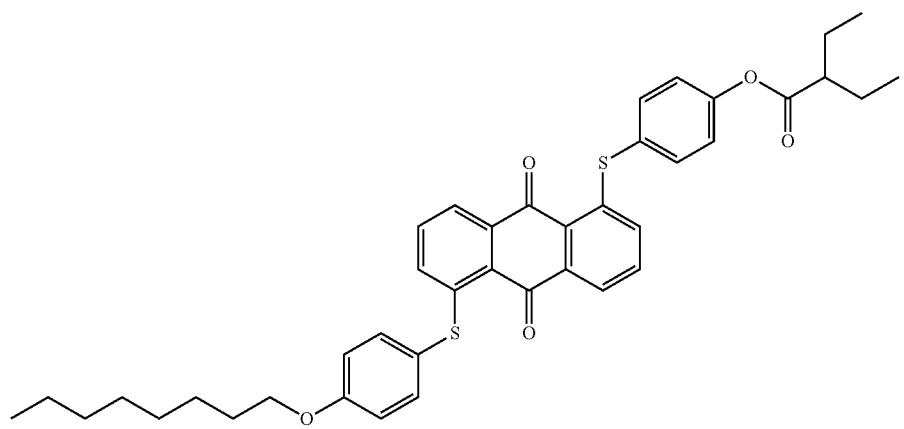
(35)
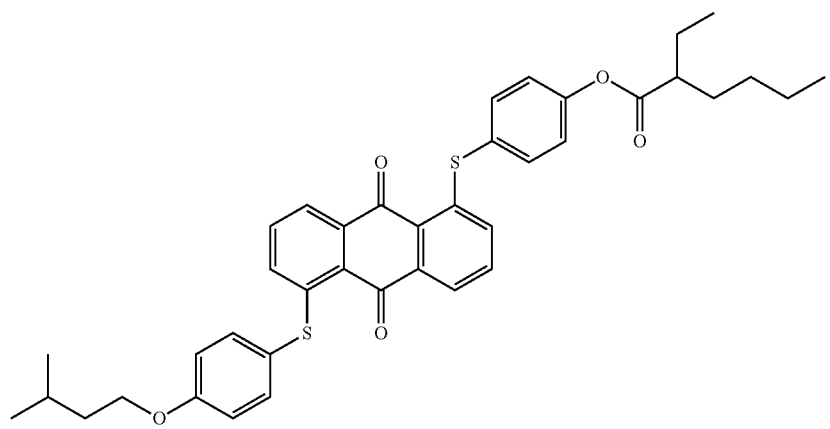
(36)
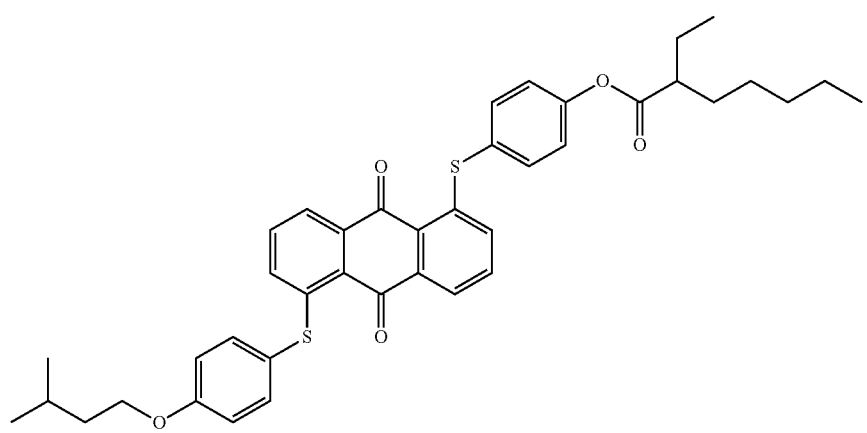

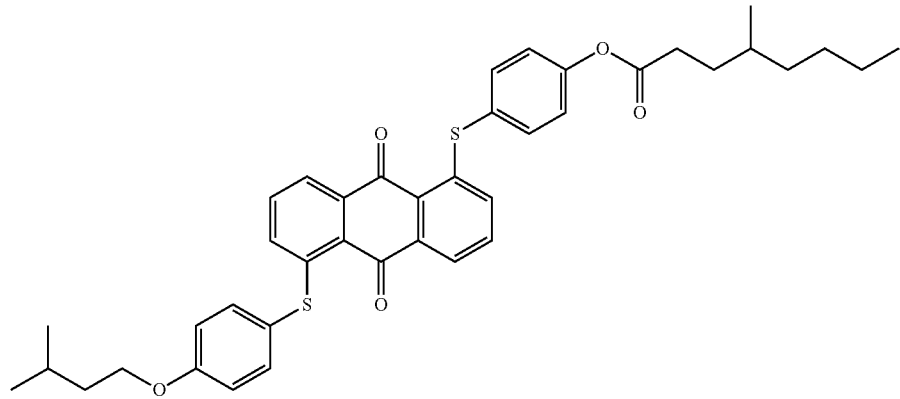
(37)
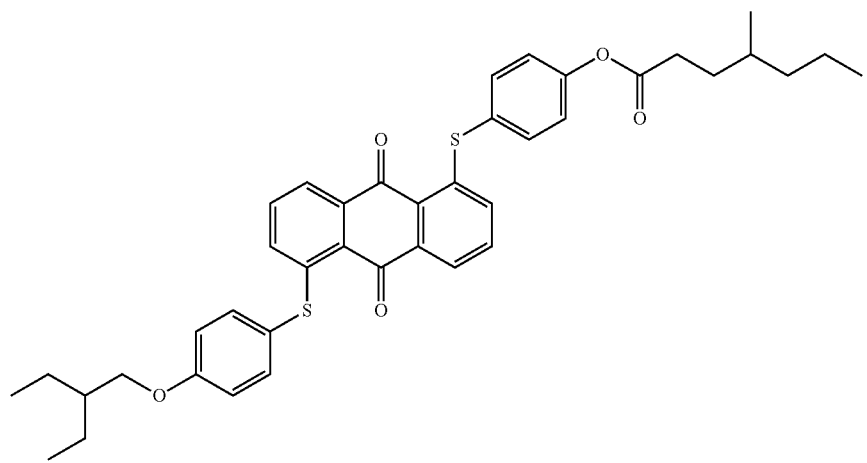
(38)
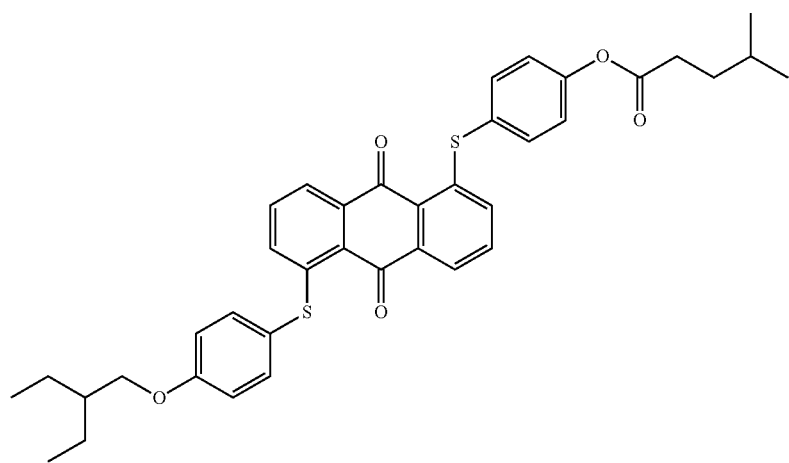
(39)

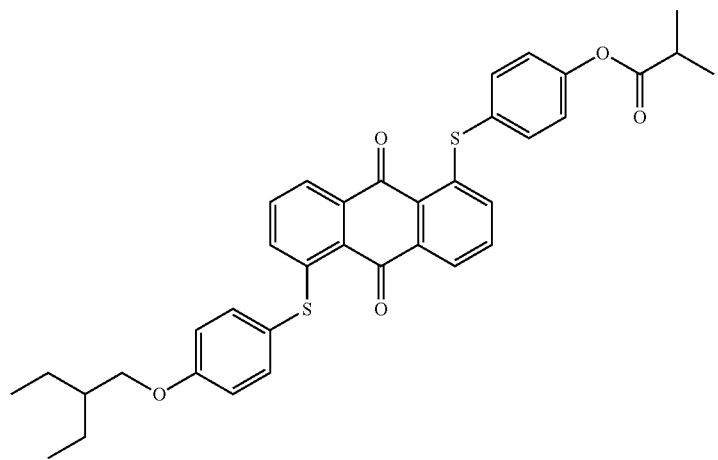
(40)
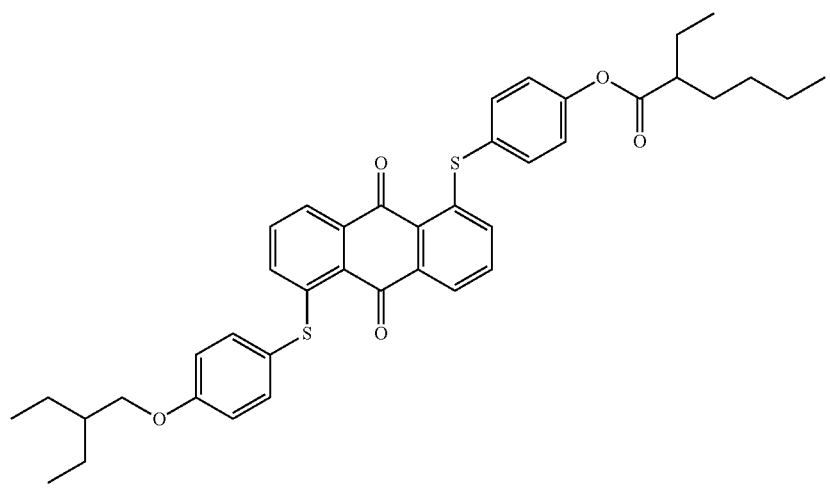
(41)
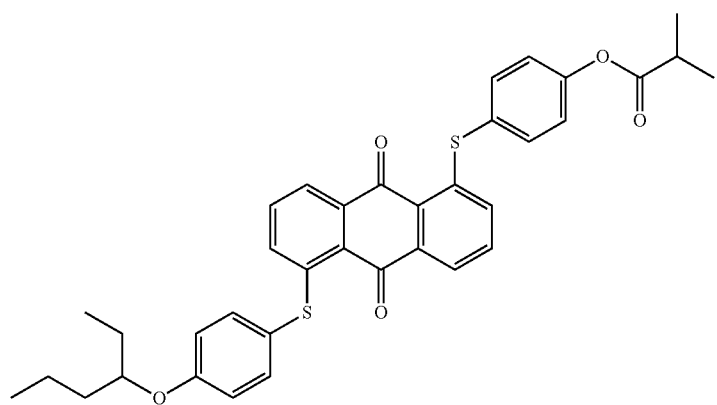
(42)

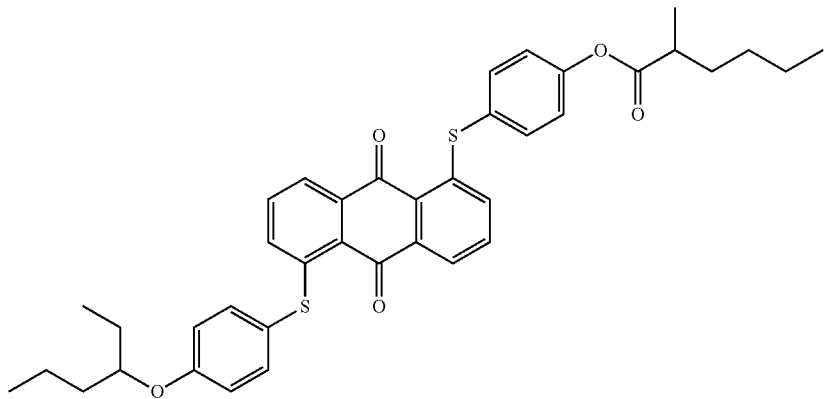

(43)

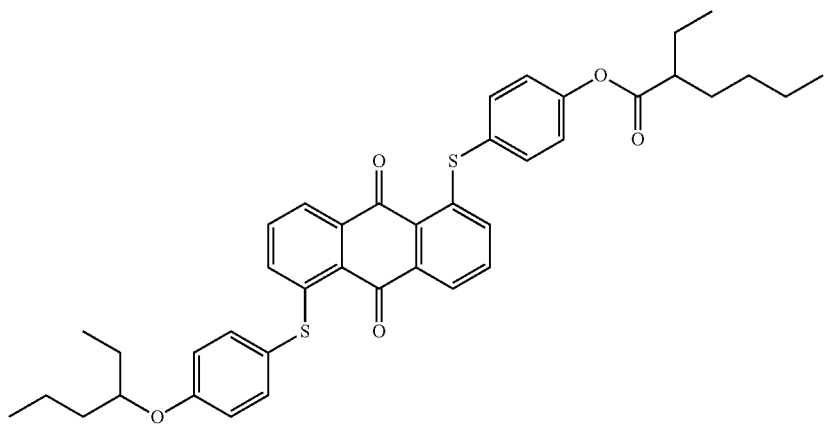

(44)

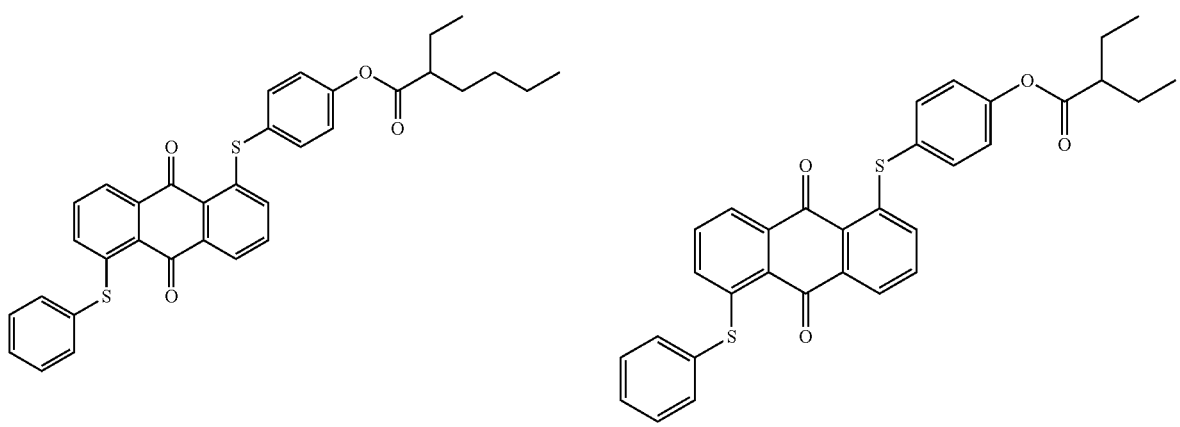

(45)

(46)

The compound represented by Formula (A) can be synthesized using a conventionally known method described in, for example, WO 87/02688 A.

The liquid crystal composition of the present invention (hereinafter, sometimes simply referred to as "the composition of the present invention") contains an anthraquinone compound represented by Formula (A) and a liquid crystal material.

An order parameter (S value) of the anthraquinone compound represented by Formula (A) contained in the composition of the present invention is preferably 0.76 or more, and more preferably 0.77 or more.

The order parameter (S value) in the present invention can be calculated from the following formula described in "Liquid Crystal Device Handbook" (edited by Japan Society for the Promotion of Science, the 142nd Committee, The Nikkan Kogyo Shimbun, Ltd., 1989) on the basis of spectroscopic measurement of a dichroic ratio of the anthraquinone compound (dichroic dye) represented by Formula (A).

$$S=(A_{//}-A_{\perp})/(2A_{\perp}+A_{//})$$

In the formula, "$A_{//}$" and "$A_{\perp}$" represent an absorbance of a dye for light polarized parallel and perpendicular to a liquid crystal orientation direction, respectively. The calculated S value theoretically takes a value in a range of 0 to 1, and as the value approaches 1, the contrast as a guest-host type light control element is improved.

The content of the anthraquinone compound represented by Formula (A) in the liquid crystal composition is not particularly limited, but is preferably 0.5 to 5 parts by mass with respect to 100 parts by mass of the liquid crystal material. When a dichroic dye (described later) other than the compound represented by Formula (A) is used together, the total content of the anthraquinone compound represented by Formula (A) and the dichroic dye other than the compound represented by Formula (A) is preferably in the above-mentioned range, that is, 0.5 to 5 mass % with respect to 100 parts by mass of the liquid crystal material.

The liquid crystal material contained in the composition of the present invention is not particularly limited as long as it is a material having liquid crystallinity (a compound having liquid crystallinity) such as a nematic liquid crystal, a cholesteric liquid crystal, or a smectic liquid crystal, but among them, a nematic liquid crystal is preferable. Examples of the compound having liquid crystallinity include liquid crystal compounds described in pages 154 to 192 and pages 715 to 722 in "Liquid Crystal Device Handbook" (edited by Japan Society for the Promotion of Science, the 142nd Committee, The Nikkan Kogyo Shimbun, Ltd., 1989) described above.

The liquid crystal composition of the present invention may contain a dichroic dye other than the anthraquinone compound represented by Formula (A), or an optically active substance that exhibits or does not exhibit a liquid crystal phase, such as cholesteryl nonanoate, various additives such as an ultraviolet absorber and an antioxidant, a photocurable compound, a photopolymerization initiator, and the like.

The photocurable compound that can be contained in the composition of the present invention is not particularly limited as long as it is a compound having a functional group that can be polymerized by the action of a photopolymerization initiator described later when irradiated with light. As the photocurable compound, both of a monofunctional monomer having one polymerizable functional group and a bifunctional monomer having two polymerizable functional groups are preferably used together.

The monofunctional monomer as the photocurable compound used in the composition of the present invention has compatibility with a liquid crystal in the composition before light irradiation, and forms a cured product phase by phase separation from the liquid crystal when polymerized by light irradiation, and plays a role in reducing the interface interaction with the liquid crystal phase. Therefore, when the polarity of the monofunctional monomer is excessively high, the interface interaction with the liquid crystal phase becomes too strong and inhibits the movement of the liquid crystal, and a high driving voltage is required. Therefore, it is preferable that the polarity of the monofunctional monomer is low.

The bifunctional monomer as the photocurable compound used in the composition of the present invention forms a cured product phase by phase separation from the liquid crystal when polymerized by light irradiation, and plays a role in stabilizing the separated state from the liquid crystal phase. Therefore, when the polarity of the bifunctional monomer is excessively high, the interface interaction with the liquid crystal phase becomes too strong and inhibits the movement of the liquid crystal, and a high driving voltage is required. Therefore, it is preferable that the polarity of the bifunctional monomer is also low.

Examples of the photocurable compound include a compound having a (meth)acrylate group, a compound having a vinyl group, and a compound having an allyl group. A compound having a (meth)acrylate group is preferable. That is, it is more preferable to use both a mono(meth)acrylate compound having one (meth)acrylate group in one molecule and a di(meth)acrylate compound having two (meth)acrylate groups in one molecule together.

In the present description, the term "(meth)acrylate" means "methacrylate and/or acrylate".

As the mono(meth)acrylate compound, a mono(meth)acrylate having a straight-chain, cyclic, or branched alkyl group having 5 to 13 carbon atoms is preferable. Specific examples thereof include straight-chain alkyl mono(meth)acrylates such as pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, and tridecyl (meth)acrylate, cyclic alkyl mono(meth)acrylates such as isobornyl (meth)acrylate, and branched alkyl mono(meth)acrylates such as 2-methylhexyl (meth)acrylate, 2-ethylhexyl (meth)acrylate, 2-propylhexyl (meth)acrylate, 2-methylheptyl (meth)acrylate, 2-ethylheptyl (meth)acrylate, and 2-propylheptyl (meth)acrylate.

As the di(meth)acrylate compound, for example, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,12-dodecanediol di(meth)acrylate, and 1,13-tridecanediol di(meth)acrylate, and further, trialkylene glycol di(meth)acrylates such as triethylene glycol di(meth)acrylate are suitably used.

As for the ratio between the monofunctional monomer and the bifunctional monomer when they are used together, the mass ratio of the monofunctional monomer to the bifunctional monomer is preferably 10:90 to 96:4, and more preferably 50:50 to 95:5. When the amount of the monofunctional monomer used is in the above-mentioned ratio range, the compatibility of the monofunctional monomer with the liquid crystal does not become too high. Therefore, moderate separation between the polymer (polymer phase) formed by light irradiation and the liquid crystal phase occurs and it is possible to prevent gelation of only the monomer, and in addition, it is easy to form a separated phase between the polymer phase and the liquid crystal phase.

The compatibility between the photocurable compound and the liquid crystal material contained in the liquid crystal composition of the present invention can be evaluated by first compatibilizing the photocurable compound with the liquid crystal material, and then visually observing phase separation that occurs with a decrease in temperature with a polarized light microscope, or can be evaluated based on a phase separation temperature from measurement such as DSC. The phase separation temperature between the photocurable compound and the liquid crystal material is preferably in a range of 0 to 50° C., and more preferably in a range of 10 to 40° C. When the phase separation temperature is set in the above-mentioned range, the photocurable compound and the liquid crystal material in the liquid crystal composition have good compatibility, and phase separation does not occur after polymerization of the photocurable compound proceeds by light irradiation. As a result, the formed liquid crystal phase is not excessively small, and therefore, the driving voltage can be reduced, and in addition, it becomes easy to maintain the compatibilized state of the composition until light irradiation is performed.

The photopolymerization initiator that can be contained in the composition of the present invention is not particularly limited as long as it is a compound capable of polymerizing the photocurable compound by light irradiation. The photopolymerization initiator is preferably one that does not deteriorate the dichroic dye such as the anthraquinone compound represented by Formula (A) by remaining in the cured product after light irradiation.

As the photopolymerization initiator, for example, alkylphenone-based photopolymerization initiators such as Darocure 1173, Irgacure 651, and Irgacure 184, and phosphine oxide-based photopolymerization initiators such as Irgacure TPO are preferably used.

When the composition of the present invention contains the photocurable compound and the photopolymerization initiator, the blending ratio of the total of the compound represented by Formula (A) and the liquid crystal material to the photocurable compound is preferably 90:10 to 50:50, more preferably 80:20 to 50:50, and still more preferably 65:35 to 50:50 in mass ratio. When the blending ratio of the photocurable compound is set within the above-mentioned range, it is possible to prevent separation of the liquid crystal material from the photocurable compound before curing by light irradiation and deterioration of the light shielding property of the cured product.

When a dichroic dye (described later) other than the compound represented by Formula (A) is used together, the blending ratio of the total of all the dichroic dyes including the compound represented by Formula (A) and the liquid crystal material to the photocurable compound in the composition of the present invention is preferably within the above-mentioned range (90:10 to 50:50 in mass ratio). A more preferable range and a still more preferable range are the same as those described above.

The content of the photopolymerization initiator in the composition of the present invention when the composition contains the photocurable compound and the photopolymerization initiator is preferably 0.1 to 5 parts by mass with respect to 100 parts by mass of the photocurable compound.

Use of a dichroic dye other than the compound represented by Formula (A) together in the composition of the present invention can improve the contrast of the light control element at the time of light shielding.

The dichroic dye that can be used together is not particularly limited, and may be selected from, for example, an azo dye, an anthraquinone dye, a perylene dye, a quinophthalone dye, a merocyanine dye, an azomethine dye, a phthaloperylene dye, an indigo dye, an azulene dye, a dioxazine dye, and a polythiophene dye. Specific examples thereof include dyes described in "Dichroic dyes for Liquid Crystal Display" (written by A. V. Ivashchenko, C R C, 1994).

Among them, an azo dye, an anthraquinone dye, a perylene dye, or a quinophthalone dye is preferably used together, and an azo dye or an anthraquinone dye is more preferably used together.

When a dichroic dye other than the compound represented by Formula (A) is used together, the content of the compound represented by Formula (A) in all the dichroic dyes is not particularly limited as long as the effect of the present invention is not impaired. The amount thereof is preferably 1 to 95 mass %, more preferably 10 to 90 mass %, and still more preferably 30 to 80 mass %.

In the composition of the present invention, a light stabilizer such as a benzotriazole-based light stabilizer, a benzophenone-based light stabilizer, or a hindered amine-based light stabilizer, an antioxidant such as a phosphite-based antioxidant or a hindered phenol-based antioxidant, a thermal polymerization inhibitor, a thiol compound, a photosensitivity enhancing agent, a photosensitivity increasing agent, a chain transfer inhibitor, a polymerization inhibitor, an adhesiveness imparting agent, an antifoaming agent, a crosslinking agent, a surfactant, a thermosetting accelerator, a thermoplastic resin, a thermosetting resin, a thickener such as urethane diacrylate, and the like may be further used together.

In addition, in order to control a cell gap in a light control element, a spherical or cylindrical spacer of silica, glass, plastics, ceramics, or the like may be added. The cell gap at this time can be set within a range of 2 to 100 μm.

The composition of the present invention is obtained by mixing and stirring an anthraquinone compound represented by Formula (A) and a liquid crystal material, which are essential components, and optional components such as a photocurable compound and a photopolymerization initiator which are added as needed. Mixing and stirring may be performed by, most simply, placing all the components in a container and manually stirring the components, but it is effective to perform stirring using a device such as a magnetic stirrer. In addition, in order to efficiently produce a uniform composition, it is preferable to first prepare a uniform mixture of a photocurable compound, a photopolymerization initiator, and a liquid crystal material, then add the compound represented by Formula (A) and other optional components, and stir and mix them. During stirring and mixing, heating may be performed as needed. Stirring and mixing under a light source that emits light having an absorption wavelength of the photopolymerization initiator are preferably performed in as short a time as possible. After mixing the components, filtration may be further performed using a mesh, a membrane filter, or the like.

Irradiating the composition of the present invention containing a photocurable compound and a photopolymerization initiator with light provides a cured product of the liquid crystal composition in which a photocurable compound component is cured (polymerized). The "cured product" in the present invention means a product having a state in which the functional group of the photocurable compound is polymerized or copolymerized by light irradiation, and does not necessarily mean a cured product in which the anthraquinone compound represented by Formula (A), the liquid crystal material, or the like has contributed to the curing reaction.

The light source at the time of light irradiation is not particularly limited as long as the light source can emit light having a wavelength absorbed by the photopolymerization initiator. Preferable examples of the light source include a high-pressure mercury lamp, a metal halide lamp, a xenon lamp, and a halogen lamp capable of emitting ultraviolet rays.

The temperature at the time of light irradiation is preferably a temperature at which the composition can maintain a uniformly compatibilized state, that is, a temperature higher than the phase separation temperature, and more preferably in a temperature range higher than the phase separation temperature by 1 to 5° C. When the temperature at the time of light irradiation is higher than the phase separation temperature, the photocurable compound and the liquid crystal material are prevented from being separated before light irradiation, and a more uniform cured product can be obtained. On the other hand, since the temperature at the time of light irradiation is not significantly higher than the phase separation temperature, the size of a domain formed by the liquid crystal material can be prevented from becoming excessively small when the polymer of the photocurable compound obtained by photocuring and the liquid crystal material are separated.

In the light control element of the present invention, a layer of the liquid crystal composition of the present invention or a photocured product of the liquid crystal composition is sandwiched between a pair of oppositely disposed substrates, at least one of which is a transparent substrate having a transparent electrode. Here, examples of the substrate include a colorless transparent, colored transparent, or opaque substrate such as an inorganic transparent material such as glass or quartz, a metal, a metal oxide, a semiconductor, ceramics, a plastic plate, or a plastic film. The electrode is formed on the substrate by, for example, forming a thin film of a metal oxide, a metal, a semiconductor, an organic conductive material, or the like on the entire surface or a part of the substrate by a known method such as a coating method, a printing method, or a vapor deposition method such as sputtering. In particular, in order to obtain a light control element having a large area, it is desirable to use an electrode substrate in which an ITO (indium oxide, tin oxide) electrode is formed on a transparent polymer film such as PET using a vapor deposition method such as sputtering, a printing method, or the like from the viewpoint of productivity and processability. In a more preferable aspect, both of the pair of substrates are transparent substrates each having a transparent electrode. It is noted that a wiring for connecting electrodes or connecting an electrode to the outside may be provided on the substrate. For example, a segment driving electrode substrate, a matrix driving electrode substrate, an active matrix driving electrode substrate, or the like may be used. Furthermore, the surface of the electrode provided on the substrate may be entirely or partially covered with a protective film or an orientation film made of an organic compound such as polyimide, polyamide, silicone, or a cyan compound, an inorganic compound such as $SiO_2$, $TiO_2$, or $ZrO_2$, or a mixture thereof.

Use of a plastic film as the substrate provides a flexible and lightweight light control element. Therefore, it is possible to use the light control element by being sandwiched between a pair of sheets of flat or curved glass, hard plastic, or the like via an adhesive layer of polyvinyl butyral, vinyl acetate, a double-sided tape, an adhesive, or the like. Alternatively, the light control element can be used by being attached to a surface of one sheet of flat or curved glass, hard plastic, or the like with a double-sided tape, an adhesive, or the like. Alternatively, the light control element may be sandwiched between soft plastic sheets or attached to one side or both sides thereof. Alternatively, a protective layer such as a hard coat, an ultraviolet cut layer, an infrared cut layer, or a half mirror may be provided on the substrate surface opposite to the electrode surface of the light control element, or a color filter may be laminated thereon or a polarizer filter may be attached thereto. In addition, the light control element may be laminated with an electroluminescence display element, a light emitting diode display element, an electrochromic display element, or another liquid crystal display element.

A driving device for applying a voltage to the light control element of the present invention is a device capable of applying a DC voltage of 2 to 100 V or an AC voltage of 10 to 1000 Hz, and may be any device that causes an open or short circuit between electrodes when no voltage is applied. The driving device may include a voltage application circuit for driving a segment, a voltage application circuit for driving a matrix, a voltage application circuit for an active matrix, or the like.

The light control element of the present invention may be either a black light control element or a color light control element depending on the application. In the light control element of the present invention, in a specific wavelength region, the average transmittance at the time of light transmission is preferably 35% or more, and more preferably 40% or more. The average transmittance at the time of light shielding is preferably 25% or less, and more preferably 15% or less.

The black light control element has a neutral color, and causes little color leakage when no voltage is applied in a visible light region, has excellent contrast, and also has excellent light resistance against long-term outdoor exposure, and thus is optimal for in-vehicle applications or building material applications.

EXAMPLES

Hereinafter, the present invention will be described in more detail with reference to Examples, but these are illustrative and do not limit the present invention at all. The terms "part" and "%" in the present text are on amass basis unless otherwise specified. The maximum absorption wavelength in Examples is a value measured with a spectrophotometer "UV-3150" manufactured by Shimadzu Corporation.

Example 1 (Synthesis of Compound Represented by Formula (5) as Specific Example)

(Step 1) Synthesis of Intermediate Compound Represented by Formula (47)

To 120 parts of DMF, 10.0 parts of 1,5-dichloroanthraquinone, 7.3 parts of potassium carbonate, and 6.0 parts of 4-hydroxybenzenethiol were added, and the mixture was stirred at 60° C. for 4 hours. After the reaction liquid was cooled to 25° C., 240 parts of methanol was added thereto, and the mixture was stirred for 1 hour. The reaction product was collected by filtration and dried in a hot air dryer at 80° C. for 24 hours, thereby obtaining 6.3 parts of an intermediate compound represented by Formula (47) below.

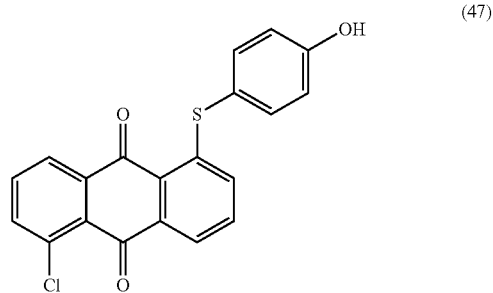 [SMILES: O=C1c2cccc(Sc3ccc(O)cc3)c2C(=O)c2cccc(Cl)c21]

(47)

(Step 2) Synthesis of Intermediate Compound Represented by Formula (48)

To 70 parts of DMF, 6.3 parts of the intermediate compound represented by Formula (47) obtained in Step 1, 3.6 parts of potassium carbonate, and 4.3 parts of 4-t-butylbenzenethiol were added, and the mixture was stirred at 60° C. for 2 hours. After the reaction liquid was cooled to 25° C., 140 parts of methanol was added thereto, and the mixture was stirred for 1 hour. The reaction product was collected by filtration, washed with toluene, and then dried in a hot air dryer at 80° C. for 24 hours, thereby obtaining 5.1 parts of an intermediate compound represented by Formula (48) below.

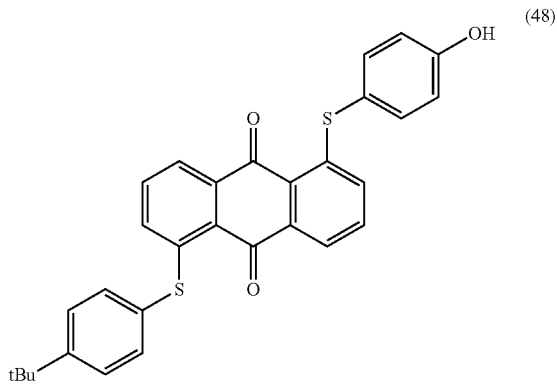 [SMILES: CC(C)(C)c1ccc(Sc2cccc3c2C(=O)c2cccc(Sc4ccc(O)cc4)c2C3=O)cc1]

(48)

(Step 3) Synthesis of Compound of Present Invention Represented by Formula (5)

To 70 parts of toluene, 5.1 parts of the intermediate compound represented by Formula (48) obtained in Step 2, 1.6 parts of 2-methylhexanoyl chloride, and 1.8 parts of triethylamine were added, and the mixture was stirred at 25° C. for 1 hour, and then, 40 parts of water was added thereto to separate the organic phase. The aqueous layer was extracted with 60 parts of ethyl acetate, then, the organic layer separated as described above and the ethyl acetate extract were mixed, and the mixture was washed with 70 parts of saturated saline. The organic layer after washing was dried over anhydrous magnesium sulfate, and then, a crude product obtained by distilling off the solvent under reduced pressure was dissolved in toluene, and column purification was performed using toluene as a developing solvent. The solvent was distilled off under reduced pressure from the solution after purification, and the resultant was dried in a hot air dryer at 80° C. for 24 hours, thereby obtaining 3.5 parts of the compound represented by Formula (5) as an orange solid. The maximum absorption wavelength of a toluene solution of the compound was 448 nm.

Example 2 (Synthesis of Compound Represented by Formula (7) as Specific Example)

The compound represented by Formula (7) (3.8 parts) was obtained as an orange solid in the same manner as in Example 1 except that 1.6 parts of 2-methylhexanoyl chloride in Step 3 was changed to 2.2 parts of 2-ethylhexanoyl chloride. The maximum absorption wavelength of a toluene solution of the compound was 448 nm.

Example 3 (Synthesis of Compound Represented by Formula (12) as Specific Example)

The compound represented by Formula (12) (2.8 parts) was obtained as an orange solid in the same manner as in Example 1 except that 4.3 parts of 4-t-butylbenzenethiol in Step 2 was changed to 3.2 parts of 4-methylbenzenethiol, and 1.6 parts of 2-methylhexanoyl chloride in Step 3 was changed to 2.2 parts of 2-ethylhexanoyl chloride, respectively. The maximum absorption wavelength of a toluene solution of the compound was 449 nm.

Example 4 (Synthesis of Compound Represented by Formula (21) as Specific Example)

The compound represented by Formula (21) (3.1 parts) was obtained in the same manner as in Example 1 except that 4.3 parts of 4-t-butylbenzenethiol in Step 2 was changed to 5.8 parts of n-octanethiol, and 1.6 parts of 2-methylhexanoyl chloride in Step 3 was changed to 1.6 parts of 5-methylhexanoyl chloride, respectively. The maximum absorption wavelength of a toluene solution of the compound was 448 nm.

Example 5 (Synthesis of Compound Represented by Formula (28) as Specific Example)

The compound represented by Formula (28) (2.7 parts) was obtained in the same manner as in Example 1 except that 4.3 parts of 4-t-butylbenzenethiol in Step 2 was changed to 4.2 parts of n-butoxybenzenethiol, and 1.6 parts of 2-methylhexanoyl chloride in Step 3 was changed to 1.6 parts of 2-ethylheptanoyl chloride, respectively. The maximum absorption wavelength of a toluene solution of the compound was 453 nm.

Synthesis Example 1 (Synthesis of Compound for Comparison)

A compound represented by No. 8 in Table 1 in JPS61-87756A (i.e., a compound represented by Formula (X) below) was obtained by a known synthesis method.

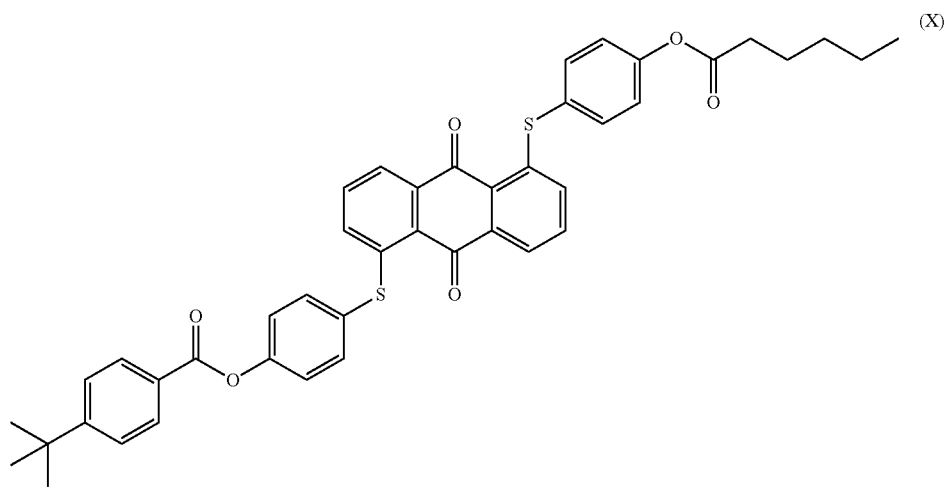 [SMILES: CCCCCC(=O)Oc1ccc(Sc2cccc3c2C(=O)c2cccc(Sc4ccc(OC(=O)c5ccc(C(C)(C)C)cc5)cc4)c2C3=O)cc1]

(X)

Synthesis Example 2 (Synthesis of Compound for Comparison)

A compound shown in Example 11 in EP 59036 A1 (i.e., a compound represented by Formula (Y) below) was obtained by a known synthesis method.

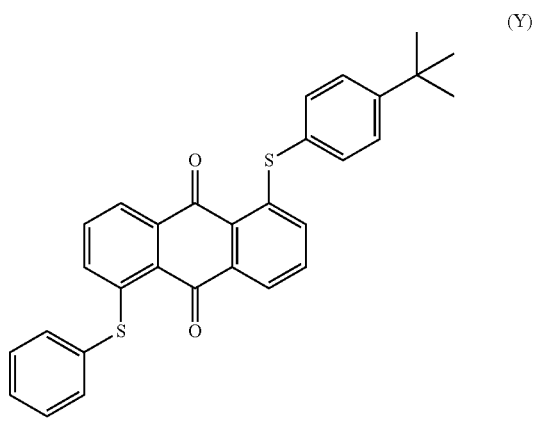 [SMILES: CC(C)(C)c1ccc(Sc2cccc3c2C(=O)c2cccc(Sc4ccccc4)c2C3=O)cc1]

(Y)

Example 6 (Preparation of Composition of Present Invention)

A liquid crystal composition of the present invention was prepared by mixing 0.0078 parts of the compound represented by Formula (5) obtained in Example 1, 0.306 parts of 1-cyano-4'-n-pentylbiphenyl, 0.15 parts of 1-cyano-4'-n-heptylbiphenyl, 0.096 parts of 1-cyano-4'-n-octyloxybiphenyl, and 0.048 parts of 1-cyano-4"-n-pentylterphenyl at room temperature.

Examples 7 to 10 and Comparative Examples 1 and 2 (Preparation of Liquid Crystal Compositions of Present Invention and for Comparison)

Liquid crystal compositions of the present invention and liquid crystal compositions for comparison were prepared in the same manner as in Example 6 except that the compound represented by Formula (5) obtained in Example 1 was changed to the compound represented by Formula (7) obtained in Example 2, the compound represented by Formula (12) obtained in Example 3, the compound represented by Formula (21) obtained in Example 4, the compound represented by Formula (28) obtained in Example 5, the compound represented by Formula (X) obtained in Synthesis Example 1, and the compound represented by Formula (Y) obtained in Synthesis Example 2, respectively.

Examples 11 to 15 and Comparative Examples 3 and 4 (Production of Light Control Elements of Present Invention and for Comparison)

Each of the liquid crystal compositions obtained in Examples 6 to 10 and Comparative Examples 1 and 2 was sealed into an element that includes two upper and lower glass substrates, each of which had a transparent electrode and had been subjected to a homogenous orientation treatment by rubbing a polyamide-based resin on a surface in contact with a liquid crystal and that had an inter-substrate gap of 15 μm. In the above-mentioned element, the liquid crystal was in a homogeneous orientation state when no voltage was applied, and the dye molecules were also in a similar orientation state in conformity with the liquid crystal.

(Calculation of Order Parameter of Light Control Element)

Linearly polarized light parallel to the orientation direction and linearly polarized light perpendicular to the orientation direction were made incident on the light control elements obtained in Examples 11 to 15 and Comparative Examples 3 and 4. From each spectrum at that time, an absorbance ($A_{//}$) for the linearly polarized light parallel to the orientation direction of a colored cell and an absorbance ($A_\perp$) for the polarized light perpendicular to the orientation direction were measured, and an order parameter (S value) at the maximum absorption wavelength (λmax) was obtained from the following formula. The results are shown in Table 1.

$$S=(A_{//}-A_\perp)/(2A_\perp+A_{//})$$

TABLE 1

Calculation results of order parameter (S value)

| Light control element | Maximum absorption wavelength (nm) | S value |
|---|---|---|
| Example 11 Compound of Formula (5) | 466 | 0.78 |
| Example 12 Compound of Formula (7) | 465 | 0.77 |
| Example 13 Compound of Formula (12) | 466 | 0.78 |
| Example 14 Compound of Formula (21) | 465 | 0.77 |
| Example 15 Compound of Formula (28) | 468 | 0.79 |
| Comparative Example 3 Compound of Formula (X) | 463 | 0.75 |
| Comparative Example 4 Compound of Formula (Y) | 465 | 0.73 |

As shown in Table 1, it was revealed that the light control elements of Examples 11 to 15 had a higher order parameter than the light control elements of Comparative Examples 3 and 4, and were excellent as a light control element.

(Light Resistance Test of Light Control Element)

A UV cut filter for a wavelength of 400 nm or less was connected to each of the light control elements obtained in Examples 11 to 15 and Comparative Example 3, and the S value when light irradiation was performed for 200 hours using a metal halide lamp having an illuminance of 650 W/m² under a condition of 63° C. was measured. The S value after light irradiation for 200 hours is shown in the following Table 2 together with the S value before light irradiation (i.e., the value shown in Table 1 above) for the light control element of each example. As shown in Table 2, the S value of each of the light control elements of Examples 11 to 15 had a small temporal change, but the S value of the light control element of Comparative Example 3 significantly decreased after a lapse of 200 hours. From these results, it was verified that the light control elements of Examples 11 to 15 had excellent light resistance.

TABLE 2

Results of light resistance test

| Light control element | Maximum absorption wavelength (nm) | S value (0 h) | S value (200 h) |
|---|---|---|---|
| Example 11 Compound of Formula (5) | 466 | 0.78 | 0.77 |
| Example 12 Compound of Formula (7) | 465 | 0.77 | 0.77 |

TABLE 2-continued

Results of light resistance test

| Light control element | Maximum absorption wavelength (nm) | S value (0 h) | S value (200 h) |
|---|---|---|---|
| Example 13 Compound of Formula (12) | 466 | 0.78 | 0.78 |
| Example 14 Compound of Formula (21) | 465 | 0.77 | 0.76 |
| Example 15 Compound of Formula (28) | 468 | 0.79 | 0.79 |
| Comparative Example 3 Compound of Formula (X) | 463 | 0.75 | 0.70 |

Example 16 (Preparation of Liquid Crystal Composition of Present Invention)

A liquid crystal composition of the present invention was prepared by mixing 0.026 parts of the compound represented by Formula (5) obtained in Example 1, 0.380 parts of isobornyl acrylate (monoacrylate, manufactured by Osaka Organic Chemical Industry, Ltd.), 0.020 parts of triethylene glycol dimethacrylate (manufactured by Shin-Nakamura Chemical Co., Ltd.), 0.306 parts of 1-cyano-4'-n-pentylbiphenyl, 0.15 parts of 1-cyano-4'-n-heptylbiphenyl, 0.096 parts of 1-cyano-4'-n-octyloxybiphenyl, 0.048 parts of 1-cyano-4''-n-pentylterphenyl, 0.004 parts of Irgacure TPO (manufactured by BASF SE), 0.004 parts of Irgacure 184 (manufactured by BASF SE), and 0.010 parts of a spacer agent (Micropearl (registered trademark) SP220 manufactured by Sekisui Chemical Co., Ltd.) having a diameter of 20 μm at room temperature.

Examples 17 to 20 and Comparative Example 5 (Preparation of Liquid Crystal Compositions of Present Invention and for Comparison)

Liquid crystal compositions of the present invention and a liquid crystal composition for comparison were prepared in the same manner as in Example 16 except that 0.026 parts of the compound represented by Formula (5) obtained in Example 1 was changed to 0.026 parts of the compound represented by Formula (7) obtained in Example 2, 0.026 parts of the compound represented by Formula (12) obtained in Example 3, 0.026 parts of the compound represented by Formula (21) obtained in Example 4, 0.026 parts of the compound represented by Formula (28) obtained in Example 5, and 0.007 parts of the compound represented by Formula (X) obtained in Synthesis Example 1, respectively. The maximum dissolved amount of the compound represented by Formula (X) obtained in Synthesis Example 1 in the liquid crystal mixture was 0.007 parts.

Examples 21 to 25 and Comparative Example 6 (Production of Light Control Elements of Present Invention and for Comparison)

A liquid crystal composition layer was formed by applying each of the liquid crystal compositions obtained in Examples 16 to 20 and Comparative Example 5 onto an ITO film of a 5 cm square PET film provided with the ITO film using an applicator. Subsequently, this film and a 5 cm square PET film provided with an ITO film which is the same as described above were superimposed so that the liquid crystal composition layer on the ITO film and the ITO film faced each other. Thereafter, while the sample of the laminate of the two films and the liquid crystal composition layer thus obtained was maintained at 23° C. with a thermoplate, the sample was set at a position where the light intensity at 365 nm of an LED lamp was 9 mW/cm², and light irradiation was performed for 1 minute to photocure the photocurable compound, thereby obtaining each of light control elements of the present invention and a light control element for comparison.

(Calculation of Contrast of Light Control Element)

For each of the light control elements obtained in Examples 21 to 25 and Comparative Example 6, the maximum absorption wavelength was measured, and the contrast (i.e., a ratio of the transmittance during voltage application/the transmittance during no voltage application) was calculated from the measurement results of transmittance at the maximum absorption wavelength when a 100 V AC voltage (50 Hz sine wave) was applied and when no voltage was applied. The results are shown in Table 3.

TABLE 3

Calculation results of contrast

| Light control element | Maximum absorption wavelength (nm) | Voltage (0 V) | Voltage (100 V) | Contrast |
|---|---|---|---|---|
| Example 21 Compound of Formula (5) | 466 | 10 | 43 | 4.3 |
| Example 22 Compound of Formula (7) | 465 | 10 | 43 | 4.3 |
| Example 23 Compound of Formula (12) | 466 | 10 | 45 | 4.5 |
| Example 24 Compound of Formula (21) | 465 | 11 | 45 | 4.1 |
| Example 25 Compound of Formula (28) | 468 | 10 | 46 | 4.6 |
| Comparative Example 6 Compound of Formula (X) | 463 | 33 | 70 | 2.1 |

As shown in Table 3, the light control elements of Examples 21 to 25 had a contrast about 2 times or more the contrast of the light control element of Comparative Example 6. In addition, the light control elements of Examples 21 to 25 had a transmittance at the time of light shielding lower by 20% or more than that of the light control element of Comparative Example 6, and had excellent light shielding performance. Therefore, it is clearly seen that the light control elements of Examples 21 to 25 exhibited much more excellent performance as compared with the light control element of Comparative Example 6.

(Light Resistance Test of Light Control Element)

A UV cut filter for a wavelength of 400 nm or less was connected to each of the light control elements obtained in Examples 21 to 25 and Comparative Example 6, an absorbance at the maximum absorption wavelength when light irradiation was performed for 24 hours using a metal halide lamp having an illuminance of 650 W/m² under a condition of 63° C. was measured, and an absorbance retention ((δA) %) was calculated. The absorbance retention ((δA) %) is defined by the following formula wherein the value of absorbance before light irradiation (that is, at 0 hours after light irradiation) is A(0) and the value of absorbance after light irradiation for 24 hours is A(24). The larger the value of δA, the higher the light resistance.

$$(\delta A)\% = (A(24)/A(0)) \times 100$$

The absorbance retention is shown in Table 4 below together with the maximum absorption wavelength for the light control element of each example. As shown in Table 4, the light control elements of Examples 21 to 25 had a significantly higher absorbance retention than the light control element of Comparative Example 6. Therefore, it is clearly seen that the light control elements of Examples 21 to 25 exhibited much more excellent light resistance as compared with the light control element of Comparative Example 6.

TABLE 4

Results of light resistance test

| Light control element | Maximum absorption wavelength (nm) | Absorbance retention (%) |
| --- | --- | --- |
| Example 21 Compound of Formula (5) | 466 | 82.9 |
| Example 22 Compound of Formula (7) | 465 | 84.5 |
| Example 23 Compound of Formula (12) | 466 | 85.6 |
| Example 24 Compound of Formula (21) | 465 | 81.1 |
| Example 25 Compound of Formula (28) | 468 | 84.8 |
| Comparative Example 6 Compound of Formula (X) | 463 | 42.7 |

Example 26 (Production of Black Light Control Element)

A liquid crystal composition of the present invention was prepared in the same manner as in Example 16 except that 0.026 parts of the compound represented by Formula (5) obtained in Example 1 was changed to 0.009 parts of the compound represented by Formula (7) obtained in Example 2, and 0.012 parts of LCD121 (i.e., an anthraquinone-based compound, manufactured by Nippon Kayaku Co., Ltd.) and 0.009 parts of LCD212 (i.e., an anthraquinone-based compound, manufactured by Nippon Kayaku Co., Ltd.) were added. A black light control element was produced in the same manner as in Examples 21 to 25 using the liquid crystal composition. The obtained black light control element had an average contrast of 3.5 at 400 to 700 nm, and showed a high contrast.

The black light control element obtained in Example 26 had no change in transmittance even after a lapse of 500 hours in a xenon light resistance test, and also had excellent light resistance when exposed to light for a long time. These results showed that the black light control element of Example 26 was a black liquid crystal light control element having high contrast and light resistance.

INDUSTRIAL APPLICABILITY

Use of the liquid crystal composition of the present invention provides a liquid crystal element for light control that has high contrast and high light resistance, and the liquid crystal element can be suitably used for outdoor building material applications and in-vehicle applications in which high durability is required.

The invention claimed is:

1. An anthraquinone compound represented by Formula (A) below:

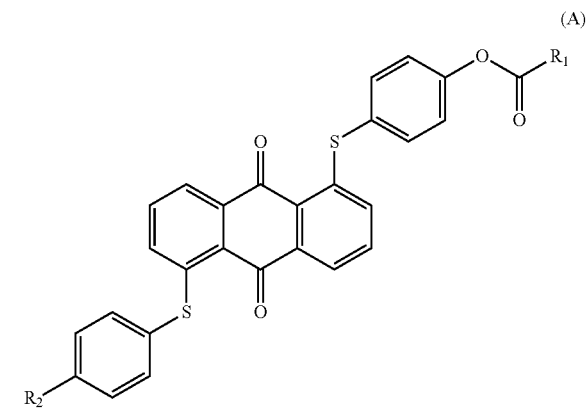

(A)

wherein $R_1$ represents a branched alkyl group having 3 to 16 carbon atoms, and $R_2$ represents a hydrogen atom, a straight-chain alkyl group having 1 to 8 carbon atoms or a branched alkyl group having 3 to 8 carbon atoms, or a straight-chain alkoxy group having 1 to 8 carbon atoms or a branched alkoxy group having 3 to 8 carbon atoms.

2. The anthraquinone compound according to claim 1, wherein $R_1$ is a branched alkyl group having 6 to 16 carbon atoms.

3. The anthraquinone compound according to claim 2, wherein $R_1$ is a branched alkyl group represented by Formula (B) below:

(B)

wherein $R_3$ represents a straight-chain alkyl group having 1 to 6 carbon atoms, and $R_4$ represents a straight-chain alkyl group having 1 to 9 carbon atoms, provided that a total number of carbon atoms in the straight-chain alkyl group represented by $R_3$ and carbon atoms in the straight-chain alkyl group represented by $R_4$ is 5 to 15.

4. The anthraquinone compound according to claim 3, wherein $R_3$ is a methyl group and $R_4$ is a straight-chain alkyl group having 4 to 7 carbon atoms, or $R_3$ is an ethyl group or a propyl group and $R_4$ is a straight-chain alkyl group having 3 to 7 carbon atoms.

5. The anthraquinone compound according to claim 1, wherein $R_2$ is a straight-chain alkoxy group having 1 to 8 carbon atoms.

6. The anthraquinone compound according to claim 5, wherein $R_2$ is a straight-chain alkoxy group having 1 to 4 carbon atoms.

7. The anthraquinone compound according to claim 1, wherein $R_2$ is a hydrogen atom or a straight-chain alkyl group having 1 to 4 carbon atoms or a branched alkyl group having 3 or 4 carbon atoms.

8. A liquid crystal composition comprising the anthraquinone compound according to claim 1 and a liquid crystal material.

9. The liquid crystal composition according to claim 8, further comprising a dichroic dye other than the anthraquinone compound represented by Formula (A), wherein said dichroic dye other than the anthraquinone compound represented by Formula (A) comprises at least one dye selected from the group consisting of an azo dye, an anthraquinone dye, a perylene dye, a quinophthalone dye, a merocyanine dye, an azomethine dye, a phthaloperylene dye, an indigo dye, an azulene dye, a dioxazine dye, and a polythiophene dye.

10. The liquid crystal composition according to claim 8, further comprising a photocurable compound and a photopolymerization initiator.

11. A photocured product comprising the liquid crystal composition according to claim 10.

12. A light control element comprising a pair of substrates that are oppositely disposed, and the liquid crystal composition according to claim 8 or the photocured product according to claim 11 sandwiched between the substrates, at least one of the substrates being a transparent substrate having a transparent electrode.

13. The light control element according to claim 12, wherein both of the pair of substrates are transparent substrates each having thereon a transparent electrode.

14. The anthraquinone compound according to claim 2, wherein $R_2$ is a straight-chain alkoxy group having 1 to 8 carbon atoms.

15. The anthraquinone compound according to claim 3, wherein $R_2$ is a straight-chain alkoxy group having 1 to 8 carbon atoms.

16. The anthraquinone compound according to claim 4, wherein $R_2$ is a straight-chain alkoxy group having 1 to 8 carbon atoms.

17. The anthraquinone compound according to claim 2, wherein $R_2$ is a hydrogen atom or a straight-chain alkyl group having 1 to 4 carbon atoms or a branched alkyl group having 3 or 4 carbon atoms.

18. The anthraquinone compound according to claim 3, wherein $R_2$ is a hydrogen atom or a straight-chain alkyl group having 1 to 4 carbon atoms or a branched alkyl group having 3 or 4 carbon atoms.

19. The anthraquinone compound according to claim 4, wherein $R_2$ is a hydrogen atom or a straight-chain alkyl group having 1 to 4 carbon atoms or a branched alkyl group having 3 or 4 carbon atoms.

20. A liquid crystal composition comprising the anthraquinone compound according to claim 2 and a liquid crystal material.

* * * * *